United States Patent
Ooki et al.

(10) Patent No.: US 6,500,511 B1
(45) Date of Patent: Dec. 31, 2002

(54) OPTICAL DISC RECYCLING METHOD AND RECYCLED OPTICAL DISC

(75) Inventors: Hiroshi Ooki, Kanagawa (JP); Toshiyuki Kashiwagi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/626,072

(22) Filed: Jul. 26, 2000

(30) Foreign Application Priority Data

Jul. 28, 1999 (JP) ............................................ 11-213950

(51) Int. Cl.⁷ ................................................. B32B 3/02
(52) U.S. Cl. ..................... 428/64.1; 264/36.18; 264/139
(58) Field of Search ............... 428/64.1, 64.2, 428/64.4, 457, 913; 430/270.11, 495.1, 945; 264/1.33, 36.18, 139

(56) References Cited

U.S. PATENT DOCUMENTS 5,972,159 A * 10/1999 Uryu ........................... 156/344

* cited by examiner

*Primary Examiner*—Elizabeth Mulvaney
(74) *Attorney, Agent, or Firm*—Sonnenschein, Nath & Rosenthal

(57) ABSTRACT

An optical disc consisting of a substrate and at least a recording layer formed on the substrate is recycled by peeling off the recording layer from the substrate; and bonding another substrate having a recording layer formed thereon to the substrate from which the recording layer has been removed, whereby a renewed optical disc is provided.

20 Claims, 5 Drawing Sheets

OPTICAL DISC RECYCLING METHOD AND RECYCLED OPTICAL DISC

RELATED APPLICATION DATA

The present application claims priority to Japanese Application No. P11-213950 filed Jul. 28, 1999 which application is incorporated herein by reference to the extent permitted by law.

BACKGROUND OF THE INVENTION

1. Field of the Invention

The present invention relates to an optical disc recycling method and a recycled optical disc.

2. Description of the Related Art

In the recent fields of data recording, research has been made for optical data recording and many optical recording methods are practically used. Because of many advantages, including non-contact recording and/or reproduction, recording density more than one level higher than the magnetic recording, and availability of various types of recording such as read-only, write-once and rewritable, the optical recording is conveniently used in a wide range of applications, from industrial to household.

The turnout of the optical discs such as compact discs (CD) and recordable compact discs (CD-R) has been increasing year after year, and with this increasing turnout of optical discs, unnecessary optical discs including used or unusable ones at the users and unaccepted ones at the factories have been increasing.

In the current circumstances, each of the users and manufacturers dispose such unnecessary optical discs. The optical disc is composed of a plurality of layers including a substrate of a light-transparent synthetic resin such as polycarbonate or the like, a reflecting layer of aluminum to reflect a light beam used for writing and/or reading an information signal, a protective layer of ultraviolet-curable-curable resin or the like, and a printed-label layer. So, the optical disc cannot be recycled or reused as it is. Most of those unnecessary optical discs are discarded, not recycled, which is not desirable for the standpoints of the global environment and effective utilization of natural resources.

There has been proposed an approach for recycling unnecessary optical discs, in which the unnecessary or discarded optical discs are crushed as they are and a mixture of the crushed substrate, and metal, protective and printed-label layer materials is used as a molding material. Also, there is another proposed approach. In the latter approach, the metal, protective and printed-label layers are removed from the substrate of the unnecessary optical disc by mechanical grinding or chemical treatment, and only the substrate is reused as a molding material.

There has been proposed an approach for recycling unnecessary optical discs, in which the unnecessary or discarded optical discs are crushed and a mixture of the crushed substrate, metal, protective and printed-label layer materials is used as a molding material. Also, there is another proposed approach. In the alternative approach, the metal, protective and printed-label layers are removed from the substrate of the unnecessary optical disc by mechanical grinding or chemical treatment, and only the substrate is reused as a molding material.

In the former method, the resulting mixture contains many impurities such as metallic material of the metal layer. Therefore, a product molded from the mixture will have unstable physical characteristics such as flexural strength or Young's modulus in flexure. Thus, the mixture resulted by crushing the discarded optical disc can have only a limited application. When the chemical treatment is adopted, a large amount of chemicals has to be used, which will lead to a secondary contamination and give an adverse impact to the environment.

Further, in many write-once type optical discs such as CD-R, an expensive precious metal such as gold is used as the reflecting layer. In the latter one of the above methods, however, no consideration is actually given to recycling of such an expensive metal.

OBJECT AND SUMMARY OF THE INVENTION

It is therefore an object of the present invention to overcome the above-mentioned drawbacks by providing an optical disc recycling method by which an unnecessary or unwanted optical disc can be recycled easily and inexpensively, and an optical disc renewed carrying out the optical disc recycling method.

The above object can be attained by providing an optical disc recycling method for an optical disc consisting of a substrate and at least a recording layer formed on the substrate, the method including, according to the present invention, steps of:

peeling off the recording layer from the substrate; and bonding another substrate having a recording layer formed thereon to the substrate from which the recording layer has been removed, whereby a renewed optical disc is provided.

As in the above, the new substrate having the new recording layer formed thereon is bonded to the existing substrate of the optical disc, from which the old recording layer has been removed. Thus the renewed optical disc will have the new recording layer formed on the existing substrate thereof.

Also, the above object can be attained by providing an optical disc recycling method for an optical disc consisting of a substrate and at least a recording layer formed on the substrate, the method including, according to the present invention, steps of:

grinding at least one side of the optical disc substrate; and bonding another substrate having a recording layer formed thereon to the ground side of the optical disc, whereby a renewed optical disc is provided.

As in the above, at least one side of the optical disc substrate on which at least the recording layer is formed is ground, and another substrate having a recording layer is bonded to the ground side of the existing substrate.

Thus, the new substrate having the new recording layer formed thereon is bonded to the ground side of the optical disc substrate. Therefore, the renewed optical disc will have the new recording layer formed on the existing substrate thereof.

Also, the above object can be attained by providing a recycled optical disc having a substrate from which a recording layer has been peeled off and to which another substrate having a recording layer formed thereon is bonded.

Since the above recycled optical disc still uses the substrate from which the recording layer has been removed, it is excellent in physical properties such as bending strength and Young's modulus in flexure.

Also, the above object can be attained by providing a recycled optical disc having bonded to at least one ground side thereof another substrate having a recording layer formed thereon.

Since the above recycled optical disc still uses an optical disc of which at least one side is ground, it is excellent in physical properties such as bending strength and Young's modulus in flexure.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

The optical disc recycling method according to the present invention is applicable to optical discs including a so-called compact disc (which will be referred to as a CD hereinafter) a read-only type CD (which will be referred to as "CD-ROM" hereinafter) and a recordable compact disc (which will be referred to as "CD-R" hereinafter) such as write-once type CD.

Figure 1:
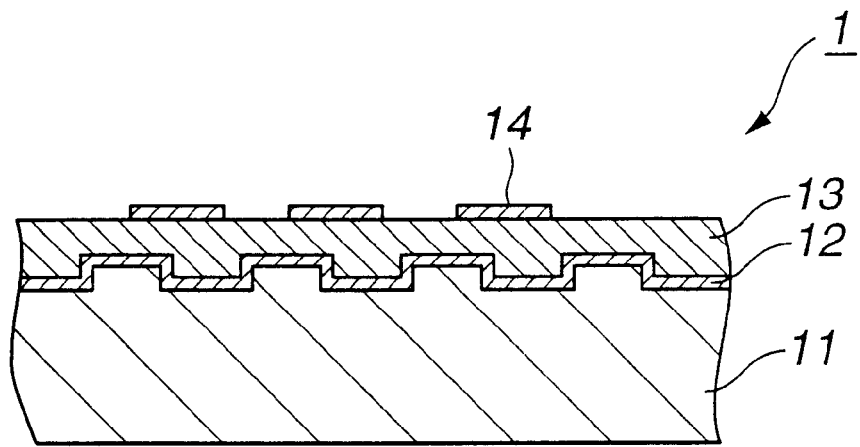
FIG. 1 is a sectional view of a compact disc (CD)
Figure 2:
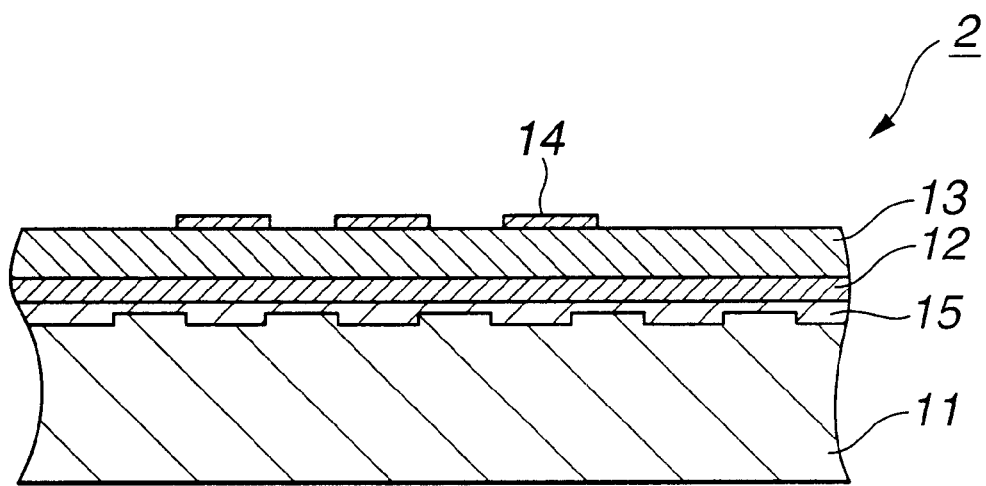
FIG. 2 is also a sectional view of a recordable compact disc (CD-R)

Referring now to FIGS. 1 and 2, there are shown typical structures of the CD and CD-R, respectively. FIG. 1 shows the structure of a read-only type optical disc 1 including a substrate 11, metal layer 12, protective layer 13 and a label 14. FIG. 2 shows the structure of a write-once type optical disc 2 including a substrate 11, dye layer 15, metal layer 12, protective layer 13 and a label 14.

As shown, the substrate 11 is formed to have a disc shape. It is molded from a light-transparent synthetic resin such as polycarbonate resin or the like. The disc-shaped substrate 1 has a hole formed in the center thereof In a read-only type optical disc, the substrate 11 has formed on one side thereof a spiral track or concentric tracks, each formed from a plurality of pits. Thus, the substrate side provides an information recording surface. The pits and lands formed in the information recording surface and the metal layer 12 will be defined herein as a recording layer.

In a recordable type optical disc, the substrate 11 has spiral or concentric pre-grooves formed on one side thereof A laser beam emitted from an optical pickup of an optical disc recording and/or reproducing apparatus comes to the recording layer from the other side of the substrate 11.

The metal layer 12 covers the one side of the substrate 11 on which the pits are formed. In the read-only type optical disc, the metal layer 12 is formed on the one side of the substrate 11 by vapor deposition or sputtering of a metal such as aluminum. In the recordable optical disc such as CD-R, the metal layer 12 is formed from gold or the like on a dye layer 15 which will further be described later.

The protective layer 13 is made of an ultraviolet-curable resin or the like and formed on the metal layer 12 to protect the metal layer 12 provided as in the above. The protective layer 13 covers the entire surface of the metal layer 12 at the one side of the substrate 11.

The label 14 is printed on the protective layer 13.

The dye layer 15 is provided in the write-once type optical disc. It is applied to and covers the one side of the substrate 11 on which the pre-grooves are formed. The dye layer 15 works as a recording layer from and/or to which information is read and/or written by utilizing the change of state of the dye layer 15 due to the irreversible change of the dye. In the preferred embodiments of the present invention, the dye layer 15 is defined as a recording layer for the recordable type optical disc. At present, the dye layer 15 of the write-once type optical disc is formed from an organic dye such as cyanine dye or phthalocyanine dye is used for the dye layer 15 of the write-once type optical disc, and it has mixed therein a quencher (singlet oxygen deactivator) or the like as the case may be.

The optical discs 1 and 2 having their structures shown in FIGS. 1 and 2, respectively, can be recycled as will be described in the following.

First, the outermost layer on the side of the substrate 11 on which the metal layer 12 is provided is peeled off. That is, in the optical discs 1 and 2 shown in FIGS. 1 and 2, respectively, the label 14 being such an outermost layer should be peeled off When the optical disc is a read-only type, that is, the optical disc 1 as shown in FIG. 1, the label 14 may be peeled off, the protective layer 13 may be peeled off after removing the label 14, or the label 14 and protective layer 13 may be peeled off together. Otherwise, the metal layer 12 may be peeled off after removal of the label 14 and protective layer 13, or the label 14, protective layer 13 and metal layer 12 may be peeled off together. As shown, the metal layer 12 is partly in the pits formed on the substrate 11. Such in-pit parts of the metal layer 12 may be completely removed or not (may be left as they are). The surface of the substrate 11 from which the layers have been removed should preferably be flattened. This surface flattening is important to assure a quality renewed optical disc.

However, if the surface of the substrate 11 from which the layers have been peeled off is found sufficiently flat, it need not be further flattened. Concavities such as pits in the surface of the substrate 11 need not be removed since they will not be any problem. Also, parts of the other layer remaining in the concavities do not need to be wholly removed unless they are convex and project from the flattened surface of the substrate 11. For example, parts of the metal layer 12 remaining in the pits formed in the substrate 11 after removal of the label 14, protective layer 13 and metal layer 12 do not need to be removed so long as the surface of the substrate 11 is sufficiently flat and the remaining parts of the metal layer 12 in the pits are not convex and do not project from the surface of the substrate 11. from the surface of the substrate 11.

Also, in the optical discs 1 and 2, the outermost one of the layers on the side of the substrate 11 on which the metal layer 12 is formed may be removed by grinding. That is, in the optical discs 1 and 2 shown in FIGS. 1 and 2, the label 14 is removed by grinding since it is the outermost layer at the side of the substrate 11 on which the metal layer 12 is formed.

In case a read-only type optical disc, that is, in the optical disc 1, the label 14 may be removed by grinding or the protective layer 13 may be removed by grinding after grinding and removing the label 14. Also, the surface of the metal layer 12 may be ground after removing the label 14 and protective layer 13 by grinding, or the surface of the substrate 11 may be ground after removing the label 14, protective layer 13 and metal layer 12 by grinding. At this time, parts of the metal layer 12 remaining in the pits formed on the substrate 11 may be completely removed or not (may be left as they are).

Concavities such as pits in the surface of the substrate 11 do not need to be removed since they will not be any problem. Also, parts of the other layer remaining in the concavities do not need to be wholly removed unless they are convex and project from the flattened surface of the substrate 11. For example, parts of the metal layer 12 remaining in the pits formed in the substrate 11 after removal of the label 14, protective layer 13 and metal layer 12 do not need to be removed so long as the surface of the substrate 11 is sufficiently flat and the remaining parts of the metal layer 12 in the pits are not convex and do not project from the surface of the substrate 11.

The above peeling or grinding and surface flattening are well known.

When the optical disc is of the write-once type, that is, the optical disc 2 as shown in FIG. 2, the label 14 may be peeled off, the protective layer 13 may be peeled off after removing the label 14, or the label 14 and protective layer 13 may be peeled off together. Otherwise, the metal layer 12 may be peeled off after removal of the label 14 and protective layer 13, or the label 14, protective layer 13 and metal layer 12 may be peeled off together. Alternatively, the dye layer 15 may be peeled off after removing the label 14, protective layer 13 and metal layer 12, or the label 14, protective layer 13, metal layer 12 and dye layer 15 may be peeled off together. The surface of the substrate 11 from which the layers have been removed should preferably be flattened. This surface flattening is important to assure a quality renewed optical disc.

However, if the surface of the substrate 11 from which the layers have been peeled off is found sufficiently flat, it does not need to be further flattened. Concavities such as pre-grooves in the surface of the substrate 11 do not need to be removed since they will not be any problem. Also, parts of the other layer remaining in the concavities do not need to be wholly removed unless they are convex and project from the flattened surface of the substrate 11. For example, parts of the dye layer 15 remaining in the pre-grooves formed in the substrate 11 of the optical disc 2 as shown in FIG. 2 after removal of the label 14, protective layer 13, metal layer 12 and dye layer 15 do not need to be removed so long as the surface of the substrate 11 is sufficiently flat and the remaining parts of the dye layer 15 in the pre-grooves are not convex and do not project from the surface of the substrate 11.

Also, in the write-once type optical, that is, the disc 2, the surface of the label 14 ground, or the surface of the protective layer 13 may be ground after removing the label 14 by grinding. Also, after the label 14 and protective layer 13 are removed by grinding, the surface of the metal layer 12 may be ground. Then, the surface of the dye layer 15 may be ground after removing, by grinding, the label 14, protective layer 13 and metal layer 12. Furthermore, the surface of the substrate 11 may be ground after removing, by grinding, the label 14, protective layer 13, metal layer 12 and dye layer 15.

Concavities such as pre-grooves in the surface of the substrate 11 do not need to be removed since they will not be any problem. Also, parts of the other layer remaining in the concavities do not need to be wholly removed unless they are convex and project from the flattened surface of the substrate 11. In the optical disc as shown in FIG. 2 for example, parts of the dye layer 15 remaining in the concavities such as the pre-grooves in the substrate 11 after removing, by grinding, the label 14, protective layer 13, metal layer 12 and dye layer 15, do not need to be removed so long as the surface of the substrate 11 is sufficiently flat and the remaining parts of the dye later 15 in the pre-grooves are not convex and do not project from the surface of the substrate 11.

The above peeling or grinding and surface flattening are well known.

In the write-once type optical disc, that is, in the optical disc 2, the metal layer 12 is formed from expensive gold or silver. Therefore, the metal layer 12 should desirably be removed for recovery. Methods for efficiently recovering the metal layer 12 are known from the disclosure in the Japanese Published Unexamined Application Nos. 10-249103 and 11-34057. The method disclosed in the Japanese Published Unexamined Application No. 10-249103 may be used for the above purpose. In this method, the dye layer 15 of the optical disc 2 is dissolved in contact with an organic solvent which will dissolve the dye layer 15 but not the substrate 11, to separate the optical disc 2 into the substrate 11, metal layer 12, protective layer 13 and label 14 for recovery. Also, the method disclosed in the Japanese Published Unexamined Application No. 11-34057 may be employed for recovery of such precious metal. According to this method, the optical disc 2 is exposed to an ultrasound in a medium in which the ultrasound can travel, thereby peeling off the metal layer 12 from the substrate 11, and the metal layer 12 thus peeled off is heated for recovery of the precious metal.

On the other hand, a cover sheet 16 is prepared to which information is transcribed in the form of pits and grooves, and it is bonded to the flattened surface of the optical disc 1 or 2 having been flattened at the side of the substrate 11 on which the metal layer 12 used to be formed. In the following description, an optical disc in which the side of the substrate 11 on which the metal layer 12 used to be formed is flattened by the above-mentioned operations will be referred to as "recycled substrate".

The cover sheet 16 should desirably be a transparent plastic sheet for example. The cover sheet 16 should desirably be thinner than the substrate 11 and particularly approximately 0.1 mm. With the thickness of the cover sheet 16 being approximately 0.1 mm, the thickness of the recycled substrate after having the cover sheet 16 bonded thereto will be approximately 1.2 mm, which is equal to the thickness of the currently available CD, CD-R and digital versatile disc (will be referred to as "DVD" hereinafter).

Figure 3:
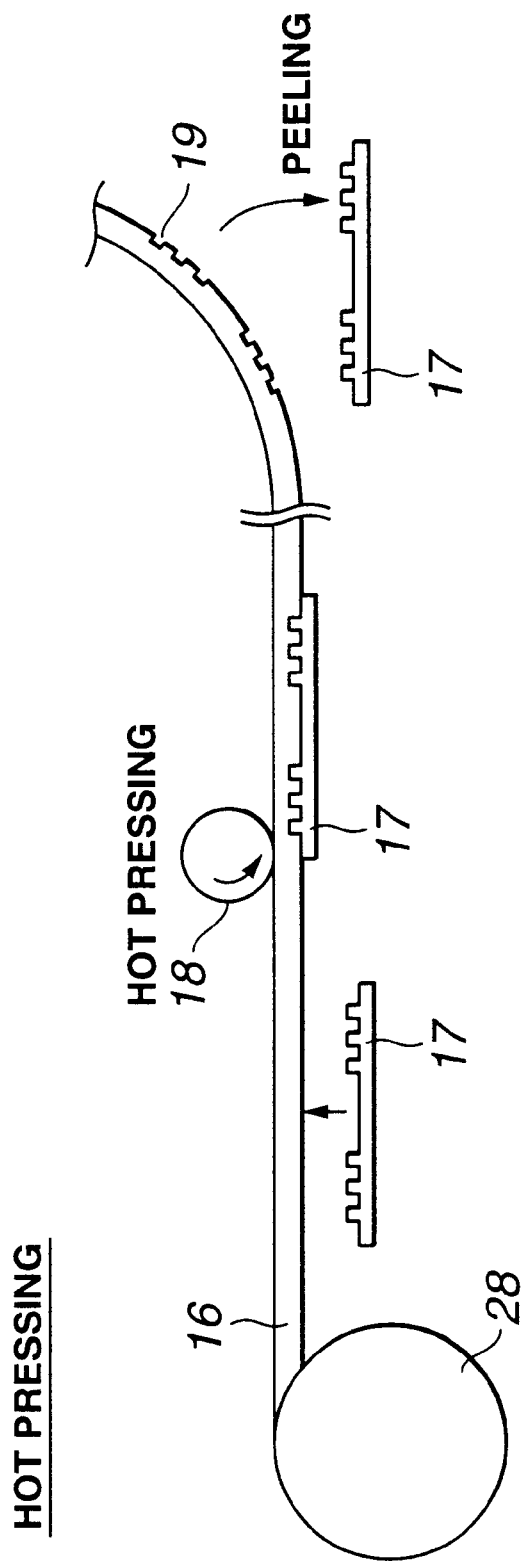
FIG. 3 shows a hot bonding process in the optical disc recycling method according to the present invention.

The pits and pre-grooves can be formed on the cover sheet 16 by a hot pressing as shown in FIG. 3.

First, the cover sheet 16 fed from a supply roll 28 is placed on a stamper 17. The cover sheet 16 and stamper 17 are passed through a pair of rolls 18 heated at a high temperature. They are thus pressed to each other so that pits and pre-grooves will be formed on the cover sheet 16.

Figure 4:
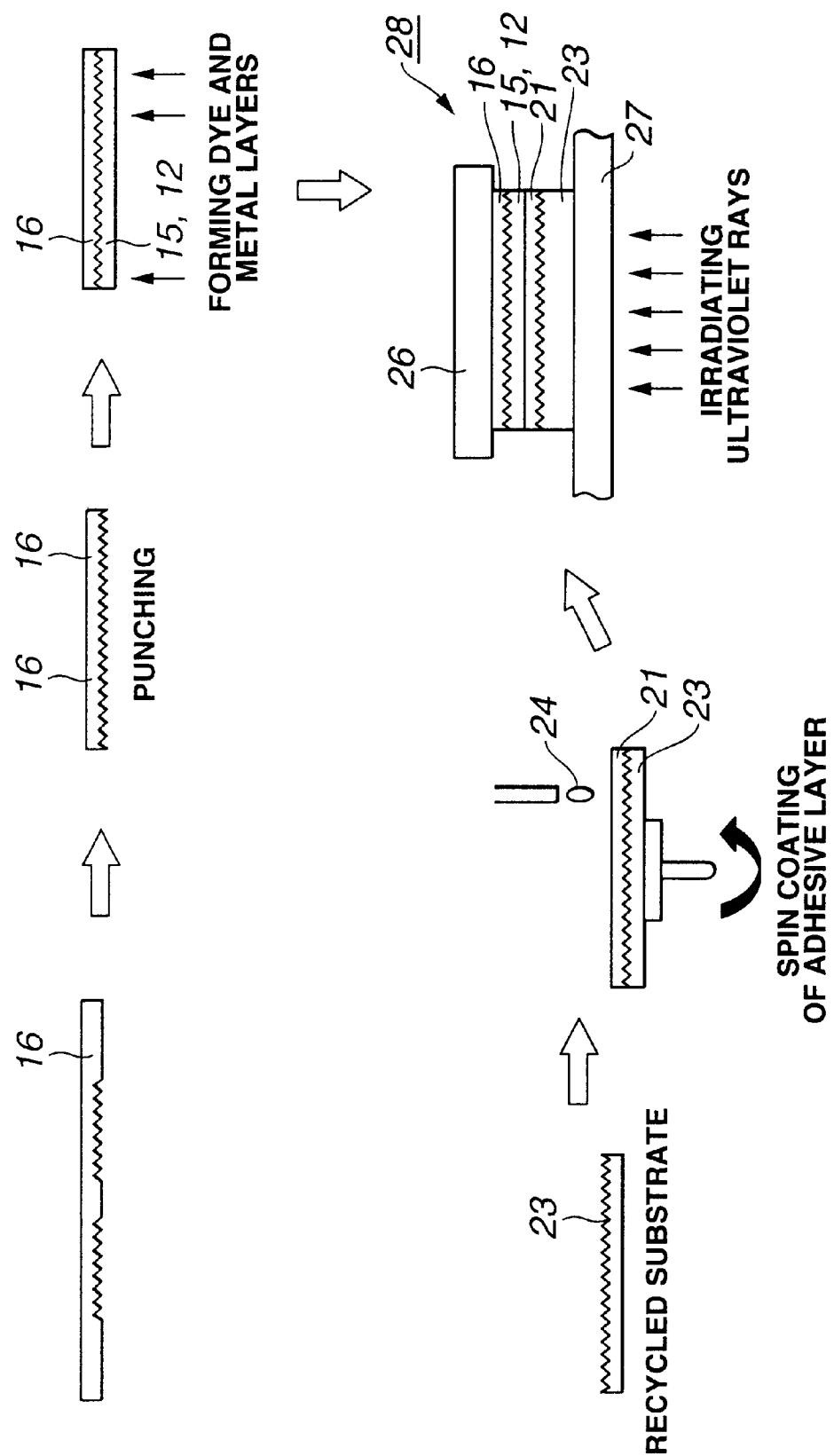
FIG. 4 shows an example of the optical disc recycling process.

Next, the cover sheet 16 is peeled off from the stamper 17, and the cover sheet 16 is punched to the same size as the recycled substrate as shown in FIG. 4.

Then, when the recycled substrate is derived from a read-only type optical disc, aluminum for example is formed by sputtering or the like on the side of the cover sheet 16 formed by punching as in the above and on which the pits and pre-grooves are formed to provide a metal layer 12 as the reflecting layer.

When the recycled substrate 23 is from a recordable type optical disc, a dye later 15 as a recording layer and a metal layer are formed by sputtering or the like on the side of the cover sheet 16 formed by punching and on which the pits and pre-grooves are formed. The dye layer 15 should preferably have the same or higher recording density as or than that of the recording layer of the optical disc before recycled. It is made possible thereby to provide a recycled optical disc having the same or higher performance as or than its original optical disc. Accordingly, a higher-grade optical disc, not any lower-graded one, can be provided by the optical disc recycling method according to the present invention. Namely, the present invention is not intended only to save the natural resources.

Then, as shown in FIG. 4, an adhesive layer 21 is formed on the recycled substrate 23 to bond to the recycled substrate the cover sheet 16 having the dye layer 15 and metal layer 12. The adhesive layer 21 may be formed from a pressure-sensitive adhesive or ultraviolet-curable resin adhesive used for manufacture of DVD. Even when concavities such as pits and grooves are in the recycled substrate 23, the pits and grooves are approximately 0.1 μm deep. The adhesive layer 21 of the above-mentioned pressure-sensitive or ultraviolet-curable resin adhesive is several μm. Thus, since the pressure sensitive or ultraviolet-curable resin adhesive fills the pits and grooves, the surface of the cover sheet 16 bonded to the recycled substrate 23 is uniformly flat, so that an outstandingly flat optical disc can be provided.

The adhesive layer 21 may be formed from an adhesive 24 by spin coating, for example, on the recycled substrate 23 as shown in FIG. 4. Then, the cover sheet 16 is superposed on the adhesive layer 21 formed on the recycled substrate 23 with the dye layer 15 and metal layer 12 on the cover sheet 16 being on the adhesive layer 21, thus the cover sheet 16 and recycled substrate 23 are bonded to each other. With a weight 26 placed on the cover sheet 16, the cover sheet 16 is surely bonded to the recycled substrate 23. When the ultraviolet-curable resin adhesive is used as the adhesive 24 as in FIG. 4, the recycled substrate 23 is first placed on a transparent base 27, the cover sheet 16 is put on the recycled substrate 23 and then the weight 26 is placed on the cover sheet 16. Ultraviolet rays are irradiated to the recycled substrate 23 through the transparent base 27. The adhesive is cured to raise a bonding between the cover sheet 16 and recycled substrate 23. Thus, there will be formed on the recycled substrate 23 a recycled optical disc 28 having a new recording layer formed thereon. The recycled substrate 23 should preferably be cleaned by degreasing before being bonded to the cover sheet 16. The cover sheet 16 can be bonded more positively to the recycled substrate 23 which has been cleaned. In FIG. 4, the flattened or ground surface of the recycled substrate 23 is indicated by a wavy line for the convenience of illustration.

The surface flatness of the cover sheet 16 having been bonded to the recycled substrate 23 depends upon that of the recycled substrate 23 to which the cover sheet has not yet been bonded. If the surface of the cover sheet 16 is irregular or wavy, a light beam incident upon the cover sheet 16 will not travel in a predetermined direction because of the irregular or wavy surface of the cover sheet 16. As a result, no accurate information recording/reproducing is possible. To avoid the above, it is essential to carefully check the flatness of the surface of the recycled substrate 23 to which the cover sheet 16 is to be bonded, and the surface waviness of the cover sheet 16 having been bonded to the recycled substrate 23 should preferably be within +/− several μm.

The recycled optical disc 28 obtained as in the above is usable as an optical disc of an ultra-high recording density, to and/or from which information is written and/or read with a light beam irradiated through the cover sheet.

The ultra-high recording density optical disc is a next-generation optical disc to and/or from which information can be written and/or read with a light beam condensed through an objective lens of a high magnification factor, for example, a one having a numerical aperture of 0.8 to 0.9. Using a violet laser of 400 to 410 nm in wavelength with this ultra-high recording density optical disc having a diameter of 12 cm, makes it possible to attain a recording capacity of in more than 15 GB even with one side of the optical disc. An optical disc having the recording capacity of 15 GB will be able to take the place of the VHS (video home system) cassette tape widely used at present and record quality digital moving picture for 3 or more hours. Therefore, the recycled optical disc according to the present invention is an excellent optical disc of a new generation, and the discarded optical discs of the older generations can be recycled as the main material for optical disc products of new generations. Furthermore, the ultra-high recording density optical disc can be produced by recycling the phase-change and magneto-optical recording materials. Since the cover sheet is as thin as about 0.1 mm, so the coma aberration caused by tilt of an optical disc is small. Thus, information can positively written to and/or read from the optical disc even with an optical disc tilt of ±1° or more when an objective lens having a high NA is used.

Since a light beam is irradiated through the cover sheet 16 from the cover sheet 16 of the recycled optical disc 28 when information is written to and/or read from the latter, the recycled substrate 23 will work as a dunmmy disc in the recycled optical disc 28. That is, the surface of the recycled substrate 23 is not irradiated with a light beam and thus the recycled optical disc 28 can be used with no problem even with some scratch or the like on the recycled substrate 23. Thus, the aforementioned recycling proposed by the present invention can be realized more easily.

Figure 5:
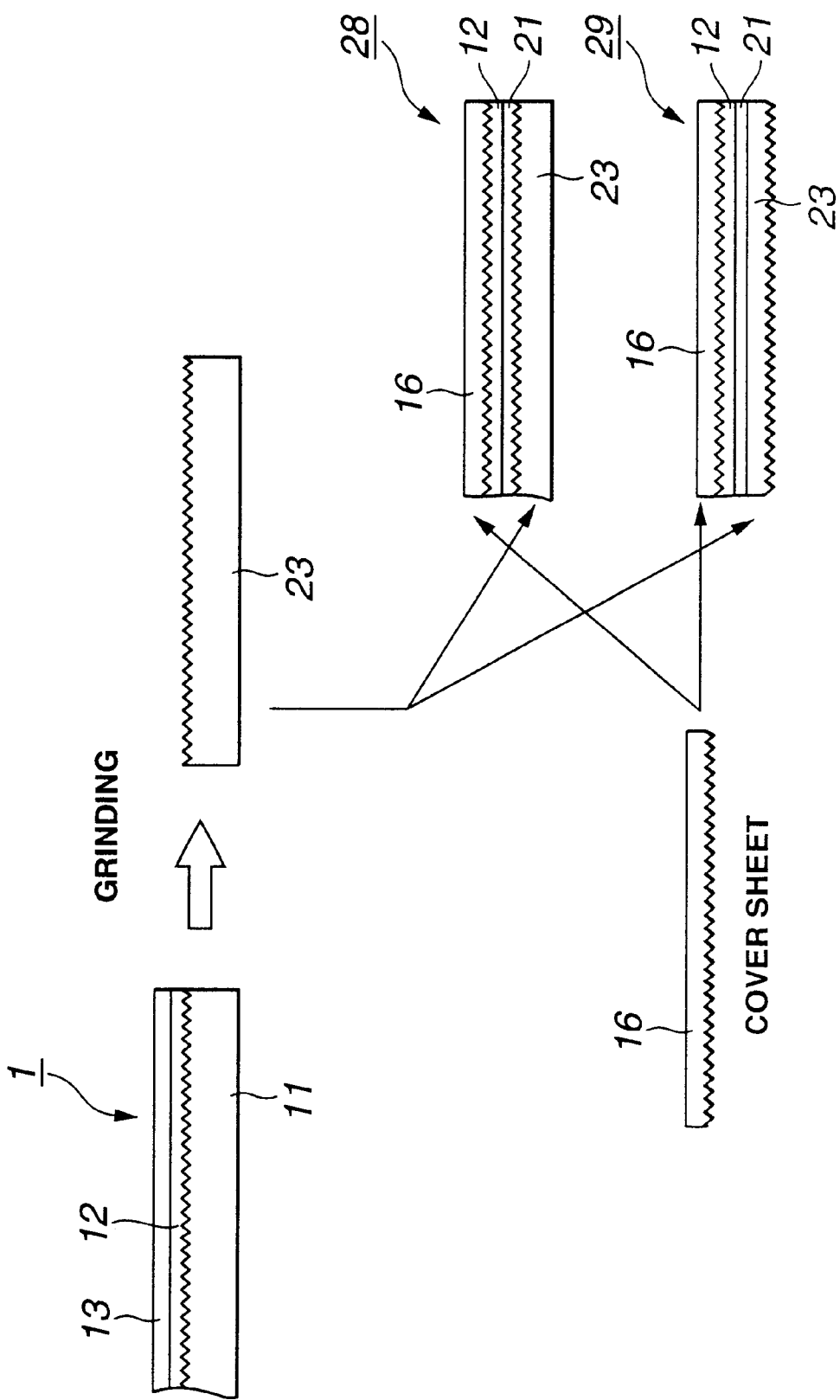
FIG. 5 shows an example of the CD recycling process.
Figure 6:
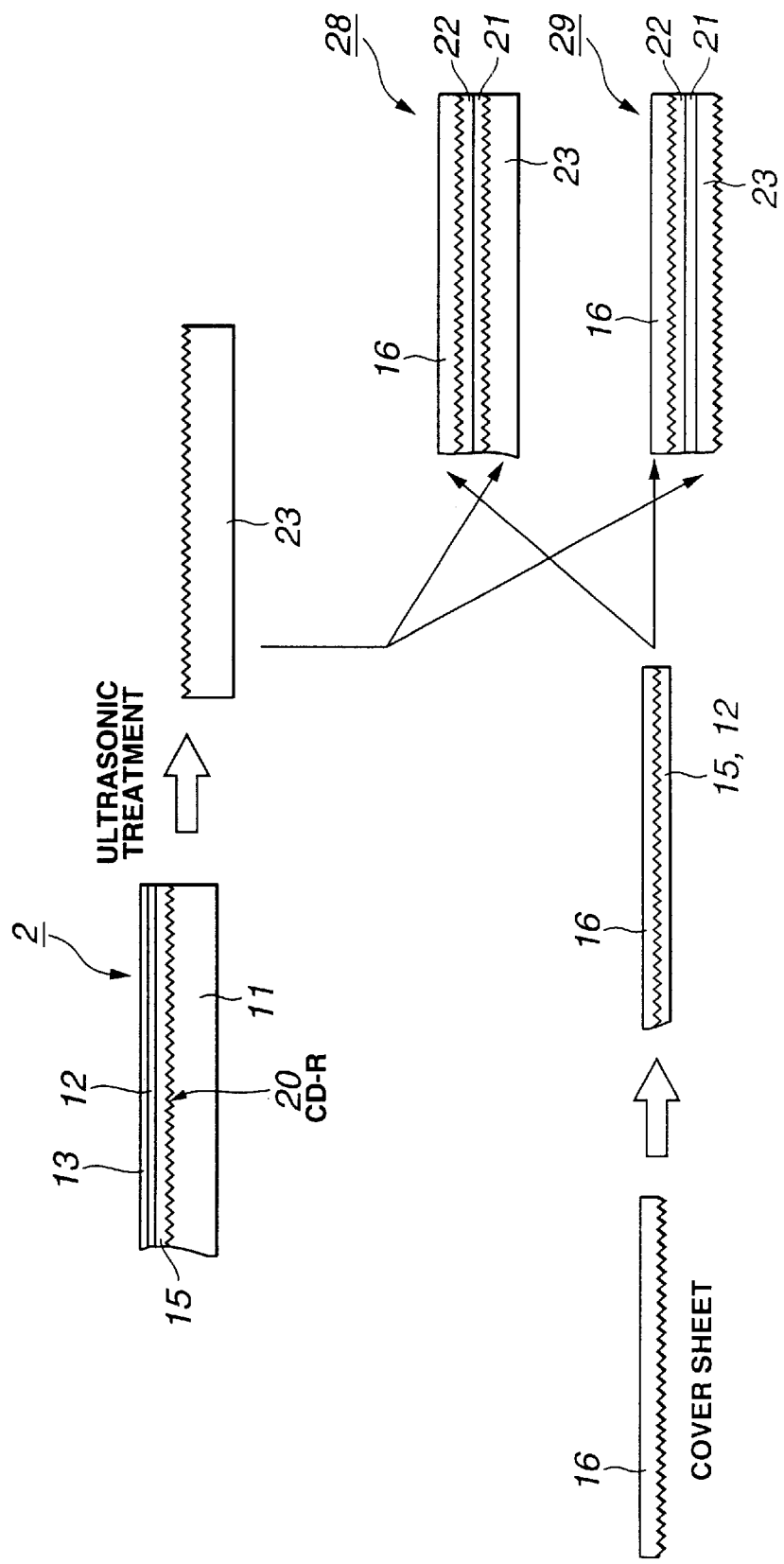
FIG. 6 shows an example of the CD-R recycling process.

In the foregoing, there has been described the flattening of the side of the optical discs 1 and 2 shown in FIGS. 1 and 2, respectively, on which the label 14 and protective layer 13, and the bonding of the cover sheet 16 is to the flattended side. However, as shown in FIGS. 5 and 6, the cover sheet 16 may be bonded to the other side of the optical discs 1 and 2, opposite to the side opposite to the side where the label 14 and protective layer 13 are formed, to produce a recycled optical disc 29. In this case, the other side of the optical disc 1 or 2 is sufficiently flat, and so may be cleaned by degreasing or otherwise before the cover sheet 16 is bonded to the recycled substrate 23. Note that in FIGS. 5 and 6, the flattened or ground surface of the recycled substrate 23 is indicated by a wavy line for the convenience of illustration.

In the foregoing, the present invention has been described concerning the embodiments of the recycled disc and recycling method according to the present invention. However, the present invention is not limited to the embodiments but numerous modifications could be made thereto without departing from the basic concept and scope of the present invention.

What is claimed is:

1. An optical disc recycling method for an optical disc having a first substrate and at least one recording layer formed on the first substrate, the method comprising steps of:

peeling off a first recording layer from the first substrate;

flattening a surface of the first substrate; and bonding a second substrate having a recording layer formed thereon to the first substrate from which the first recording layer has been removed, whereby a renewed optical disc is provided.

2. The method as set forth in claim 1, wherein the first recording layer to be peeled off is made of a dye.

3. The method as set forth in claim 1, wherein the recording density of a second recording layer formed on the second substrate is higher than that of the first recording layer to be peeled off.

4. The method as set forth in claim 1, wherein the second substrate to be bonded to the first substrate is thinner than the first substrate.

5. The method as set forth in claim 1, where the optical disc from which the first recording layer is peeled off is a discarded or unaccepted optical disc.

6. The method as set forth in claim 1, wherein the second substrate is a transparent plastic sheet.

7. An optical disc recycling method for an optical disc consisting of a substrate and at least one recording layer formed on the substrate, the method comprising steps of:

grinding at least one side of the optical disc; and bonding another substrate having a recording layer formed thereon to the ground side of the optical disc, whereby a renewed optical disc is provided.

8. The method as set forth in claim 7, wherein the recoding layer of the substrate to be grinded off is made of a dye.

9. The method as set forth in claim 7, wherein the recording density of the recording layer formed on the other substrate is higher than that of the recording layer.

10. The method as set forth in claim 7, wherein the other substrate to be bonded to the first substrate is thinner than the first substrate.

11. The method as set forth in claim 7, wherein the optical disc from which the recording layer is ground off is a discarded or unaccepted optical disc.

12. The method as set forth in claim 7, wherein the other substrate is a transparent plastic sheet.

13. The method as set forth in claim 1, wherein the flattening of the surface of the first substrate is performed by a spin coating.

14. The method as set forth in claim 1, further comprising cleaning the bonding surface's between the first substrate and the second substrate.

15. A method of recycling optical discs, comprising:

removing a first recording layer from a first substrate; and bonding the first substrate to a second substrate to form an optical disc, the second substrate having a second recording layer wherein the second substrate is thinner than the first substrate.

16. A method of recycling optical disks according to claim 15, further comprising flattening the first substrate after the dye recording layer is removed.

17. A method of recycling optical disks according to claim 15, wherein the first recording layer is removed by an adhesive process.

18. A method of recycling optical disks according to claim 15, wherein the first recording layer is removed by a grinding process.

19. A method of recycling optical disks according to claim 15, wherein the first substrate is flattened by a grinding process.

20. A method of recycling optical disks according to claim 15, wherein the first recording layer is a dye recording layer.

* * * * *